Oct. 15, 1957        E. R. SEWELL        2,809,488
POWER LAWN MOWER AND PULVERIZER
Filed Nov. 2, 1953        2 Sheets—Sheet 1
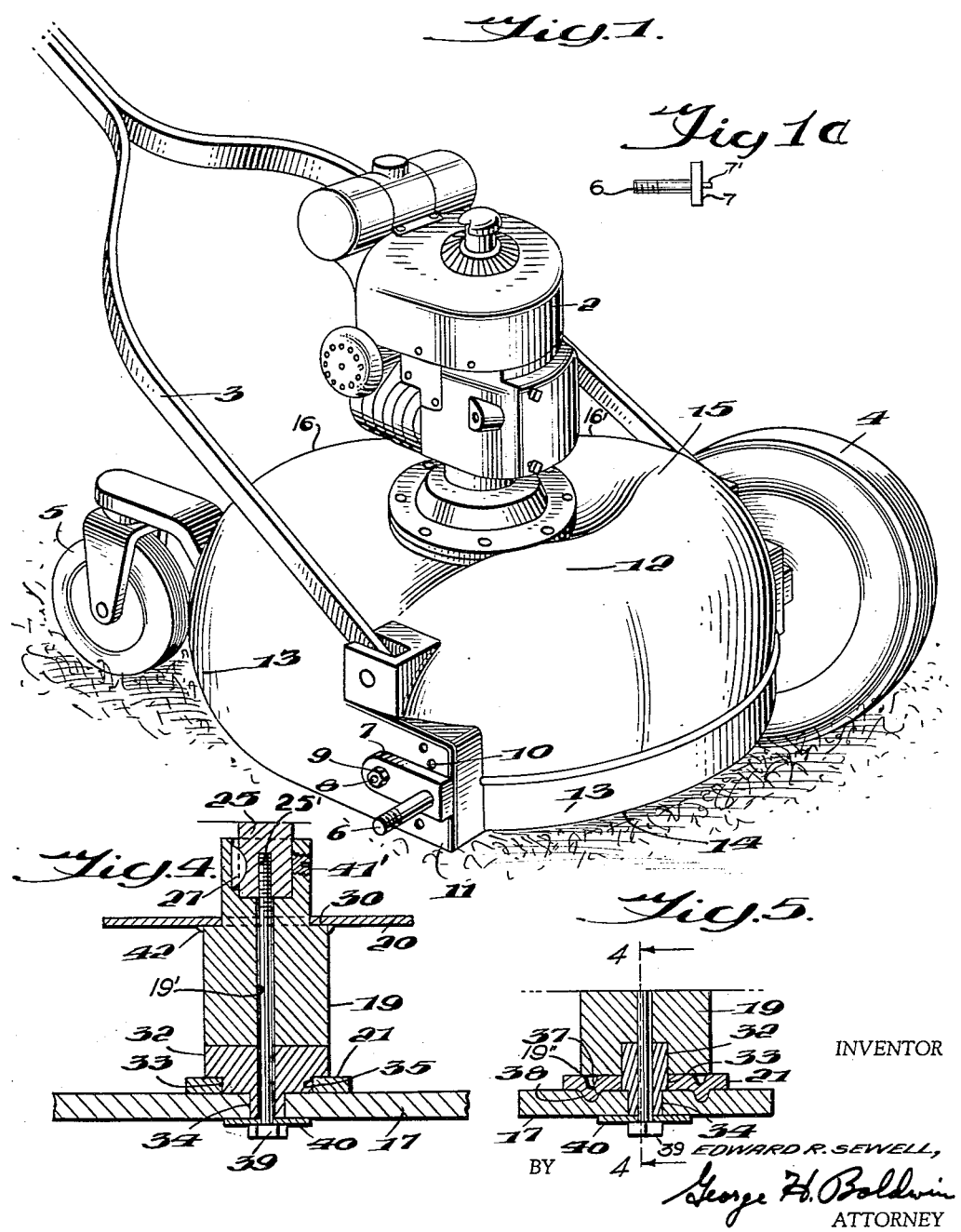
INVENTOR
EDWARD R. SEWELL,
BY George H. Baldwin
ATTORNEY

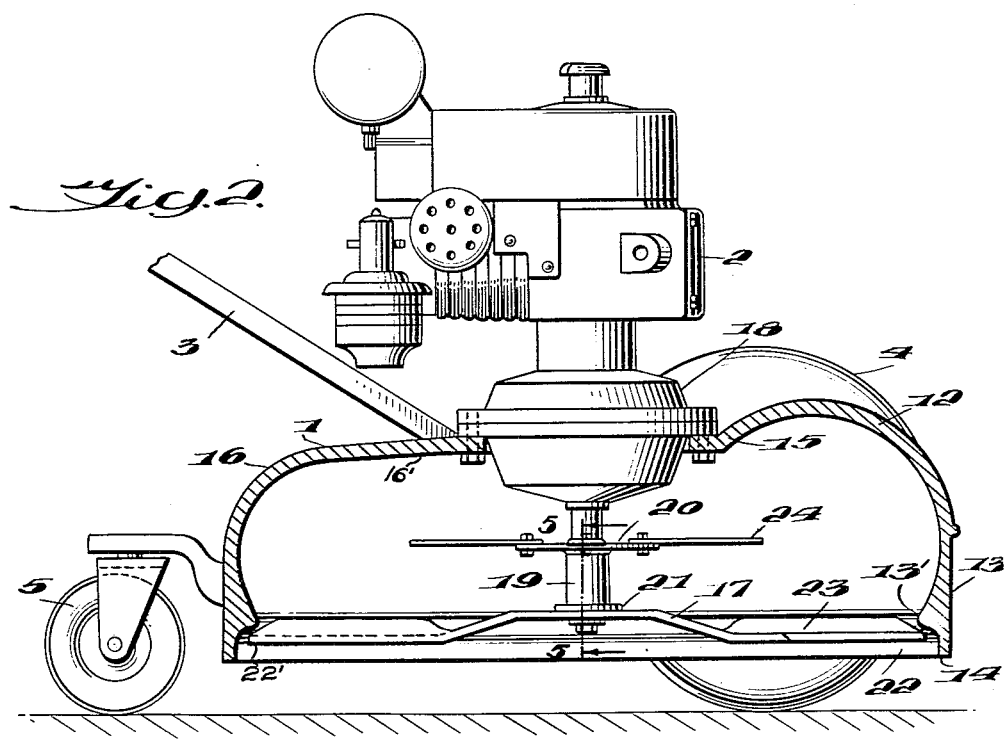
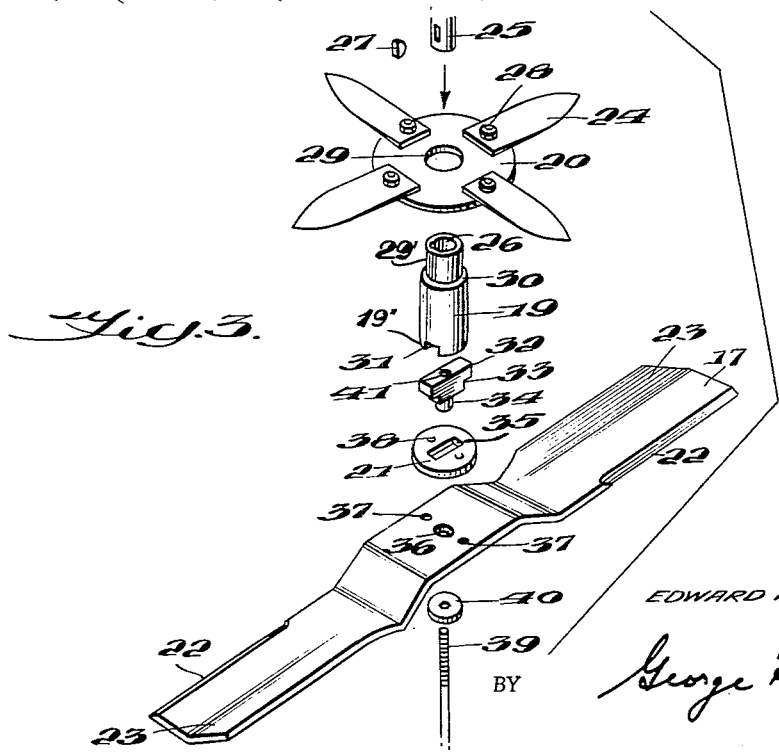

2,809,488
Patented Oct. 15, 1957

2,809,488

POWER LAWN MOWER AND PULVERIZER

Edward R. Sewell, Jacksonville, Fla.; Isola Sewell and Marjorie Lucille Holt, executrices of the estate of said Edward R. Sewell, deceased Application November 2, 1953, Serial No. 389,555

2 Claims. (Cl. 56—25.4)

This invention relates to power lawn mowers and pulverizers and contemplates a power grass cutting machine, or lawn mower, comprising a rapidly rotating blade positioned to pulverize grass cuttings which are blown past the blade, the machine being further arranged to spread the pulverized cuttings back into the lawn.

It is an object of this invention to provide a lawn mowing machine which will operate additionally as a pulverizer for the grass blades cut from the lawn.

It is another important object of this invention to improve the safety of lawn mowers of the type generally referred to as rotating blade machines.

Commonly accepted types of lawn mowers include the so-called reel type and the rotating blade type. Two principal objections to prior art machines of the latter type are that the rapidly rotating blade may throw foreign objects, such as sticks, rocks, bits of metal or glass, or pieces of the blade itself, at high speed from the machine, and that the machine leaves large pieces of severed grass in piles or ridges along the path of the mower. The rotating blade machines have the advantages, however, of being much more effective in the cutting of long-stemmed weeds and of being considerably less complicated and less expensive. It is a particular object of my invention to overcome the disadvantages of the prior art rotating blade mowers, while retaining the advantages, and further to provide the novel additional useful function of furnishing a pulverant mulch to the lawn.

The novel features which I believe to be characteristic of my invention are set forth with particularity in the appended claims. My invention itself however, both as to its organization and method of operation, together with further objects and advantages thereof, may best be understood by reference to the following description taken in connection with the accompanying drawings, in which:

Fig. 1 is a perspective view of a mower in accord with my invention, one wheel and a portion of the handle being removed for the sake of convenient illustration;

Fig. 1a is a front end elevation of a wheel mounting device included in the mower showing details thereof;

Fig. 2 is a side view of the mower of Fig. 1 with one half of the blade housing broken away and shown in section;

Fig. 3 is an exploded perspective view disclosing details of the assembly of the cutting blade and auxiliary pulverizing blades to the engine shaft;

Fig. 4 is an enlarged side view taken in vertical section longitudinally of the main cutting blade along line 4—4 of Fig. 5 showing details of the blade mounting assembly; and Fig. 5 is a sectional view similar to that of Fig. 4 but taken transversely of the blade along line 5—5 of Fig. 2.

The lawn mower and pulverizer as shown in Fig. 1 comprises a dome-like housing 1 carrying a suitable engine or motor 2, of which the main shaft 25 is vertical and extends downwardly into the center of the housing. A suitable handle 3 is pivoted to the housing 1, and the housing has side wheels 4 and a rear caster 5. One side wheel is omitted from its axle 6, the axle being suitably adapted as by threading to receive a wheel retaining nut. The axle 6 comprises a stub shaft integral with or secured to an arm 7. The arm 7 is arranged to pivot on a stud 8 which extends from the side of housing 1. Nut 9 on stud 8 may be loosened to permit arm 7 to pivot, and a small cylindrical detent pin or boss 7' as shown in Figure 1a extends inwardly from the arm 7 to engage in a selected one of depressions 10 in the enlarged boss 11 provided on the housing. By suitable selection of the appropriate depression, the height of the housing above the ground, and, thus, the level of the cutting blade, are adjusted. The nut 9 is tightened to lock arm 7 in its selected position.

In accord with the invention, the housing 1 comprises an enlarged forward chamber portion 12 which extends generally across the front portion of the housing, and further comprises a continuous circular, solid skirt portion 13 having an unbroken circular lower edge 14. The lower edge is disposed in a plane parallel to, and at least as low as and preferably a short distance lower than, the plane of rotation of the main cutting blade within the housing. The enlarged forward chamber portion 12 is bounded in part by a downwardly extending wall 15, which, generally, divides the forward portion 12 from the rearward portion 16 of the dome-like housing. The housing 1 has an upper or roof portion 16' overlying the cutting blade later described, supporting the engine 2, and completing the dome-like housing. Wall 15 comprises a portion of roof portion 16'.

Fig. 2 discloses the arrangement of the cutting blade 17 within the housing 1 for rotation with the shaft of engine 2. The engine 2 is supported on and affixed to the housing by means of a circular, flanged casing 18, in which casing are suitable bearings, oil seals, and the like. A spindle 19 connects to the lower end of the engine shaft, being keyed thereto, and serves rigidly to affix and mount to the shaft both a pulverizing blade mounting disk 20, which may be welded to a shoulder of the spindle 19, and the main cutting blade 17, which is bolted to the spindle with interposed safety attachment means, including a shear washer 21, as later described.

Blade 17 is formed with a bevelled, sharpened leading edge 22 and with an upwardly inclined trailing portion 23, to act as a deflector or fan to blow severed grass blades upwardly particularly into the curved forward chamber portion 12 of the housing. The pieces of grass thrown upwardly into chamber portion 12 swirl about and are directed downwardly by the wall 15 into the sharpened auxiliary pulverizing blades 24 which extend radially outwardly from the disk 20. Most of the blades of grass which pass through the pulverizing blades 24 without being cut into very small particles are again caught in the peripheral upward air stream and swirled back through the pulverizing blades 24, whereas the smaller particles escape principally adjacent the spindle 19 into the lawn. Some of the larger pieces of grass also escape in this manner, but, being large, such pieces do not immediately work down into the lawn but remain exposed on the top of the lawn. As the machine passes along, these larger pieces are again picked up by the upward draft created by the blade 17 sweeping under the rearward portion 16 of the housing. While being so picked up, the pieces are again subjected to the cutting edge of the blade 17 and are again swirled into the housing to meet the pulverizing blades 24. It has been found in practice that no appreciable number of severed grass blades escape the pulverizing action of the machine. The arrangement is such that large pieces tend to continue to swirl about within the housing until they are reduced almost to powder form, in which form they may escape by becoming buried in the lawn. Since there is no opening in the housing 1 which will permit severed grass blades to be ejected outwardly, beyond the path of the blade 17, there is no escape for large pieces of severed grass until such pieces are pulverized and can become buried in the lawn. The pulverized particles escape downwardly principally at the center of the housing, but, because of the air currents, even these particles are not concentrated along the center of the mowed path but are distributed outwardly substantially to the edges of the path.

The continuous solid skirt portion 13 of the housing not only prevents the escape of severed blades of grass until such blades are pulverized but also provides an important safety feature. As seen in Fig. 2, the lower continuous circular edge 14 of the skirt portion of the housing is disposed in a plane substantially parallel to the ground and parallel to and below the plane of the horizontal blade 17. There is, accordingly, almost no chance of the blade throwing any solid object outwardly from the machine. The upward draft created by the deflectors 23 of the blade 17, while effective to pick up light objects, such as paper, pine needles, leaves, blades of grass, and even small twigs, is not sufficiently strong to lift rocks, chunks of wood, metal objects, pieces of glass or brick, or the like, into the blade, and if, by some chance, a solid object of this nature should come in contact with the blades, such object cannot be thrown out by the blade because of the continuous skirt portion 13 extending below the plane of the blade. Solid objects which would project up to the level of the blade can be passed over by the edge 14 only with difficulty, and most such objects are merely pushed aside by the skirt 13. The grass to be cut is, of course, bent over by the passage of the skirt 13 in advance of the blade, but the grass tends by natural resilience to spring upwardly after the edge 14 has passed over it, and the upward draft created by the deflectors 23 insures that the grass will be pulled up to be cut by the blade. Inwardly extending lip 13' is disposed immediately and adjacently above the tip end portions 22' of blade 17, being spaced above the rotative path of the tip end portions 22' by a small clearance distance. This lip 13' tends to prevent grass particles from escaping from the dome adjacent the periphery of the dome opening and directs particles descending along the skirt wall into the blade 17 to be further cut and to be blown upwardly again into the dome if still of sufficient size.

The assembly and attachment of the blade 17 and auxiliary blades 24 to the engine shaft is best understood with reference to Fig. 3. The engine shaft 25 extends vertically downwardly to enter the axial bore 26 in spindle 19, and a suitable Woodruff key 27 engages keyways in the shaft and spindle. A set screw may also be provided as later described in connection with Fig. 4. The disk 20 has four sharp-edged pulverizing blades attached by bolts 28 normally to extend radially outwardly but adapted to pivot on the respective bolt should any of the blades strike a solid object. Disk 20 is provided with a central opening 29 which receives the upper, reduced diameter portion 29' of spindle 19 and which permits the disk to seat against shoulder 30 of the spindle. The disk is preferably welded by weld 42 shown in Fig. 4 to the spindle in this position.

The lower end 19" of spindle 19 is provided with a transversely extending rectangular groove or channel 31 proportioned to receive the upper rectangular section 32 of a transverse attachment key. The section 32 is completely received within the channel 31, and the intermediate rectangular section 33 and lower cylindrical section 34 of the key extend below the lower end of the spindle. Shear washer 21 is formed of a relatively soft metal and is of a thickness at least as great as the height of the intermediate section 33 of the key. The rectangular central opening 35 of washer 21 is proportioned to receive the section 33, whereby cylindrical section 34 extends below the washer. The blade 17 mounts on the section 34, cylindrical opening 36 being provided to receive section 34 at the center of the blade. Immediately adjacent opening 36, and on each side, are small depressions 37 in the blade which are arranged to receive nibs or lugs pressed, at 38, in the body of washer 21. The engagement of the lugs of the washer in depression 37 keys the washer to the blade 17, the washer in turn being keyed to the spindle through key sections 33 and 32. The whole assembly as described is held together by a bolt 39 which passes upwardly, through a washer 40, through a vertical bore 41 in the rectangularly sectioned key, and through a small vertical bore 19' in the spindle, extending from the lower end 19" of the spindle into communication with its upper enlarged bore 26, and into an internally threaded bore 25' in the end of shaft 25.

The main blade 17 may be formed from steel strap stock bent upwardly toward the central spindle attachment area. A sharp cutting edge 22 is formed for each active portion of the blade, and the trailing half, approximately, of each active portion is bent upwardly from the plane of the blade to form the deflectors 23. The blade is, as shown, symmetrical about the central opening 36. Since the skirt portion 13 is circular, it defines a substantially vertical medial or central axis at the axis of motor shaft 25 and spindle 19 and which coincides with the axis of rotation of blades 17 and 24.

The assembly and interrelation of the blade and spindle elements shown in Fig. 3 are further illustrated, in enlarged scale, in the sectional side views of Figs. 4 and 5, wherein the elements are shown in assembled positions. The section of Fig. 4 is taken longitudinally of blade 17. The blade 17 is held up against shear washer 21 by the head of bolt 39, and washer 40, and the shank of bolt 39 passes through the vertical bore in key 32, 33, 34, and through the small bore in spindle 19, and threads into the bore in the lower end of shaft 25. The spindle 19 is keyed by Woodruff key 27 to the shaft 25, and set screw 41' assists in affixing the spindle rigidly to the shaft. Disk 20 is shown welded, by weld 42, in fixed position against shoulder 30 of the spindle.

The upper rectangular section 32 of the spindle key fits within the lower end of the spindle 19, shear washer 21 fits about the intermediate rectangular key section 33, and the lower cylindrical section 34 engages in the central opening of the blade.

The sectional view taken transversely of the blade in Fig. 5 may be compared with the view of Fig. 4. In Fig. 5, the key sections 32 and 33 are seen to be engaged in the spindle end and in shear washer 21, respectively, and the shear lugs 38 punched in the body of the shear washer extend into the depressions 37 of the blade 17. The washer 21 may be formed of soft cold-rolled steel. If blade 17 strikes an obstruction, lugs 38 will shear off to free the blade from rotation with key 32, 33, 34. With lugs 38 sheared, the cylindrical section 34 of the key is free to rotate in the opening in the blade. It is desirable that key 32, 33, 34 be formed of a cold rolled steel which is appreciably tougher than the material of shear washer 21, that spindle 19 be formed of tempered cold-rolled steel which is tougher than the material of the key, and that the steel of the shaft 25 be highly tempered and tougher than the spindle. Selection of materials proportioned in toughness as described provides maximum safety and insurance against damage to the shaft 25 and limits possible damage, if the blade 17 strikes a large and heavy object, to the least expensive and most readily replaced parts. Accordingly, even if shear washer lugs 38 fail to shear for some reasons, the key portion 33 will shear away from portion 32 to prevent damage to spindle 19, or, if for some reason both key 32, 33, 34 and the shear lugs 38 should fail to shear, spindle 19 will break as a final safeguard to prevent shaft damage. It will be understood that shear lugs 38 will shear off except in unusual instances whenever the blade suddenly strikes an object solid enough to stop the blade, that shearing of the key portion 33 will not normally occur, and that only in very rare instances will shearing of the spindle 19 be required to free the shaft from the blade to protect the shaft.

The inward curve of the side walls into the roof portion of the dome-like housing causes the air currents which carry the cut blades of grass, leaves, and the like, to circulate through the auxiliary blades 24 and the main blade 17 for pulverizing of the grass. The dome-like shape of the housing, together with the continuous circular lower rim 14 thereof which guards the cutting blade from external objects, comprise important features of my invention. It will be understood that the lower rim guards the blade from contact with objects which might harm the blade or which might be thrown by the blade, and that the continuous rim and housing guard the blade from any inadvertent contact with animals or persons.

While I have shown and described only certain preferred embodiments of my invention by way of illustration, many modifications will occur to those skilled in the art, and I, therefore, wish to have it understood that I intend, in the appended claims, to cover all such modifications as fall within the true spirit and scope of my invention.

What I claim as new and desire to secure by Letters Patent of the United States is:

1. In a power lawn mower and pulverizer, a dome-like housing having a continuous circular skirt portion with a continuous lower edge defining a circular bottom opening of said housing, wheel elements attached to said housing to support said housing with said edge defining a plane parallel to and spaced above the ground, power driven cutting blade rotating and supporting means carried by and extending downwardly in said housing toward the center of said circular opening, a rotating cutting blade attached to said means, said blade having a plane of rotation within the skirt portion of said housing in said opening and not lower than the plane of said edge, said blade having sharp leading edges and upturned trailing edge portions, said last mentioned portions constituting deflectors to sustain a rising current of air and grass cuttings adjacent the periphery of said opening, an inwardly extending lip on said housing disposed above said plane of rotation and extending inwardly to overlie an extreme outer tip end portion of said blade and spaced a small clearance distance above the rotative path of said outer end portion of said blade, said blade extending to within a small clearance distance of said skirt portion, the dome-like shape of said housing being effective to direct said current downwardly adjacent said blade supporting means, and rotating auxiliary pulverizing blades attached to said means above said cutting blade and disposed in said downward current, said housing being enclosed against the egress of cuttings other than through said opening.

2. A power lawn mower and pulverizer comprising a dome-like housing having a continuous circular lower rim, wheels attached to said housing to support said housing with said rim substantially parallel to and spaced above the ground, motor means mounted on said housing having a rotatable shaft extending downwardly centrally within said housing, a cutting blade having a rotatable tip end portion, said blade being mounted on and extending generally horizontally outwardly from said shaft in a position to dispose said tip end portion adjacently within and above said rim whereby said tip end portion has a rotative path adjacent, above and within said rim, an inwardly extending lip disposed within and integral with said housing overlying and adjacent the rotative path of the tip end portion of the cutting blade, said blade having a fan shape effective upon rotation of said blade to blow air and grass cuttings upwardly into said housing, and a pulverizing blade mounted on said shaft above said cutting blade and within said housing and being rotatable with said shaft.

References Cited in the file of this patent

UNITED STATES PATENTS

| | | |
|---|---|---|
| 2,245,821 | Poynter | June 17, 1941 |
| 2,502,696 | Barnes | Apr. 4, 1950 |
| 2,564,586 | Smith et al. | Aug. 14, 1951 |
| 2,641,100 | Sylvester | June 9, 1953 |
| 2,649,678 | Sichc | Aug. 25, 1953 |
| 2,675,662 | Kroll | Apr. 20, 1954 |
| 2,687,607 | Sewell | Aug. 31, 1954 |
| 2,697,322 | Watrous | Dec. 21, 1954 |
| 2,701,942 | Caldwell et al. | Feb. 15, 1955 |